(12) United States Patent
Falk et al.

(10) Patent No.: US 10,106,930 B2
(45) Date of Patent: Oct. 23, 2018

(54) METHOD AND APPARATUS FOR IMPREGNATING SEMI-FINISHED FIBROUS PRODUCTS

(71) Applicant: Universität Stuttgart, Stuttgart (DE)

(72) Inventors: Gerd Falk, Stuttgart (DE); Markus Blandl, Stuttgart (DE)

(73) Assignee: Universität Stuttgart, Stuttgart (DE)

( * ) Notice: Subject to any disclaimer, the term of this patent is extended or adjusted under 35 U.S.C. 154(b) by 2 days.

(21) Appl. No.: 14/780,345

(22) PCT Filed: Mar. 21, 2014

(86) PCT No.: PCT/EP2014/055750
§ 371 (c)(1),
(2) Date: Sep. 25, 2015

(87) PCT Pub. No.: WO2014/154589
PCT Pub. Date: Oct. 2, 2014

(65) Prior Publication Data
US 2016/0069026 A1    Mar. 10, 2016

(30) Foreign Application Priority Data

Mar. 28, 2013 (DE) .................. 10 2013 205 685

(51) Int. Cl.
*D21H 25/02* (2006.01)
*B29C 70/54* (2006.01)
*B29B 15/10* (2006.01)

(52) U.S. Cl.
CPC ............. *D21H 25/02* (2013.01); *B29B 15/10* (2013.01); *B29C 70/548* (2013.01)

(58) Field of Classification Search
CPC ........ D21H 25/02; B29B 15/10; B29C 70/548
See application file for complete search history.

(56) References Cited

U.S. PATENT DOCUMENTS 2,577,727 A     12/1951   Abbott
3,384,505 A  *   5/1968   Palmer .................... C03C 25/16
                                                        427/294

(Continued)

FOREIGN PATENT DOCUMENTS

DE        695 05 366 T2    4/1999
DE    10 2011 056 703 A1    6/2013

(Continued)

OTHER PUBLICATIONS

Office Action issued in connection with German Patent Application No. 10 2013 205 685.0.

(Continued)

*Primary Examiner* — Dah-Wei D Yuan
*Assistant Examiner* — Andrew Bowman
(74) *Attorney, Agent, or Firm* — Akerman LLP

(57) ABSTRACT

In a method for impregnating semi-finished fibrous products using resin as the impregnating means, winding or laying the semi-finished fibrous products in a plurality of layers on top of one another onto a receiving carrier is initially performed. Here, lower layers lie close to the receiving carrier, and upper layers lie more remote therefrom. The receiving carrier is configured so as to be permeable to the impregnating means. The impregnating means is then introduced through the receiving carrier into the semi-finished fibrous products, wherein the impregnating means initially permeates the lower layers and then permeates the upper layers of the semi-finished fibrous products.

11 Claims, 8 Drawing Sheets

(56) References Cited

U.S. PATENT DOCUMENTS

| | | | |
|---|---|---|---|
| 3,511,697 A * | 5/1970 | Van Auken | C03C 25/12 |
| | | | 427/314 |
| 4,865,787 A | 9/1989 | Vallance et al. | |
| 4,942,013 A * | 7/1990 | Palmer | B29C 43/3642 |
| | | | 156/285 |
| 5,133,995 A | 7/1992 | Do et al. | |
| 2006/0125155 A1 | 6/2006 | Sekido et al. | |
| 2013/0280483 A1 | 10/2013 | Hayashi et al. | |

FOREIGN PATENT DOCUMENTS

| | | |
|---|---|---|
| EP | 0 525 263 A1 | 2/1993 |
| EP | 1 413 421 A1 | 4/2004 |
| EP | 2 071 064 A1 | 6/2009 |

OTHER PUBLICATIONS

German Search Report issued in connection with German Patent Application No. 10 2013 205 685.0.
International Search Report issued in connection with PCT/EP2014/055750.

\* cited by examiner

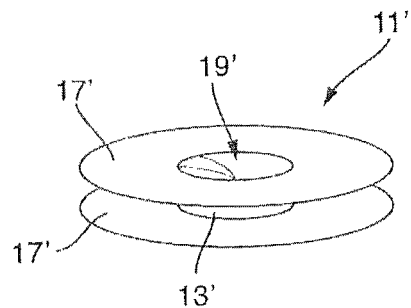
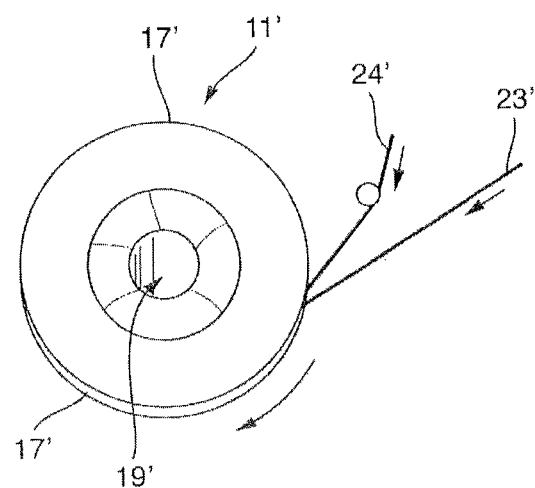
Fig. 3B
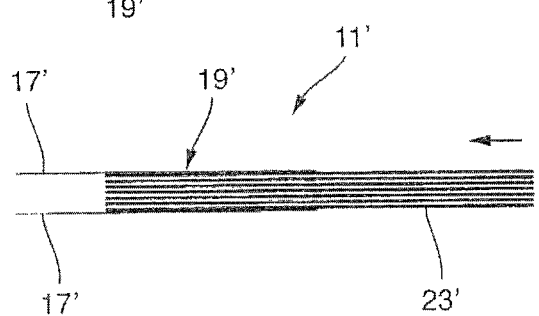

METHOD AND APPARATUS FOR IMPREGNATING SEMI-FINISHED FIBROUS PRODUCTS

This application is a national phase of PCT/EP2014/055750, filed Mar. 21, 2014, and claims priority to DE 10 2013 205 685.0, filed Mar. 28, 2013, the entire contents of which are hereby incorporated by reference.

APPLICATION FIELD AND PRIOR ART

The invention relates to a method for impregnating semi-finished fibrous products, and to an apparatus suitable for carrying out the method.

It is known in the prior art to coat semi-finished fibrous products with impregnating means in resin baths or mixing plants, respectively, or for these semi-finished fibrous products to be impregnated or infiltrated, respectively. Typically, one semi-finished fibrous product or a single strand, respectively, is individually routed or impregnated, respectively, by way of the resin bath. This means that the semi-finished fibrous product per se, which has been impregnated or coated or provided with impregnating means, respectively, would have to be wound up onto a receiving carrier, or folded up, or similar. In the case of many methods for manufacturing components having semi-finished fibrous products it may also be provided that the semi-finished fibrous products immediately after impregnating are installed or wound onto a component, or similar. However, it is disadvantageous here that the resin bath or impregnating, respectively, then has to lie close to processing in terms of space and time, which is disadvantageous in terms of the production operation. If the impregnated semi-finished fibrous products are then again wound onto a receiving carrier or similar, there is often the issue that guiding the semi-finished fibrous products in order for them to be wound may cause sizeable contamination, since the semi-finished fibrous products are, after all, provided with impregnating means.

OBJECT AND ACHIEVEMENT

The invention is based on the object of achieving a method as mentioned at the outset and an apparatus for impregnating semi-finished fibrous products, by way of which issues of the prior art may be solved and it is in particular possible for semi-finished fibrous products to be impregnated in a simple manner which is fit for use and as flexible as possible.

This object is achieved by a method having the features of claim 1. Advantageous and preferred design embodiments of the invention are the subject matter of the further claims and will be discussed in more detail hereunder. Many of the features here will be described only in the context of the method or only in the context of the apparatus. However, said features apply independently to both the method as well as the apparatus. The wording of the claims is incorporated in the description by explicit reference.

The semi-finished fibrous products are provided in the form of long or endless fibers, respectively, fiber bundles, fiber fabrics, cross-laid fiber structures, fiber braidings, or similar. In principle, the impregnating means may be any arbitrary impregnating means for semi-finished fibrous products of this type, advantageously a resin, so that said semi-finished fibrous products may be subsequently further processed in a substantially usual manner, in particular used for the manufacture of fiber-reinforced components.

It is provided for the semi-finished fibrous products to be wound or laid onto a receiving carrier or a receptacle, or a carrier or a receiving body in general, respectively, that is to say applied thereonto as a final result. This receiving carrier here is configured so as to be permeable to the impregnating means. The semi-finished fibrous products here are preferably applied in a plurality of layers on top of and across one another. Lower layers here lie close to the receiving carrier, the lowermost layer lying directly on the receiving carrier, respectively. The higher the layers are placed, the more remote they lie from the receiving carrier, the upper layers lying more remote from the receiving carrier, respectively. The semi-finished fibrous products overall form a type of semi-finished fibrous product pack. In the case of rovings having a few thousand fibers, for example 3000 fibers, there may be a total of 80 layers, or else more; there being potentially at least 5 to 20 layers in the case of rovings having significantly more fibers, for example 50 000 fibers.

In a further step the impregnating means is applied into or onto the semi-finished fibrous products, respectively, by way of infiltration or impregnation, respectively. Here, there is at least one pass through the permeable receiving carrier. In a first design embodiment of the invention the impregnating means passes through the receiving carrier into and onto the semi-finished fibrous products, that is to say initially into the receiving carrier, then therethrough into the semi-finished fibrous products. Removal of excess impregnating means may then be performed from the outside. Since the impregnating means passes through the permeable receiving carrier, the impregnating means thus initially penetrates into the layers which lie on the receiving carrier or are disposed so as to be closest thereto, respectively, that is to say into the lower layers and thereafter into the layers lying thereabove. Following this path, the impregnating means then penetrates all semi-finished fibrous products or the entire semi-finished fibrous product pack, respectively, and thus also the upper layers. Impregnating is thus substantially performed from the inside to the outside, or the impregnating means makes its way to the semi-finished fibrous products from the inside to the outside.

In a second other design embodiment of the invention the impregnating means follows the reverse path, that is to say initially goes into the semi-finished fibrous products specifically from the outside; excess impregnating means is then suctioned through the receiving carrier to the inside and removed. Here, the impregnating means makes its way to the semi-finished fibrous products from the outside to the inside.

In both cases, impregnating is readily and rapidly possible by way of a combination of positive pressure and negative pressure, or by way of a pressure differential, respectively, and specifically in an improved manner as compared to dipping or spraying.

The invention thus enables a certain amount of semi-finished fibrous products which may be impregnated in the wound or compact state, respectively, to be obtained as a result. On account thereof, it is possible, for example, to completely separate winding or laying of the semi-finished fibrous products onto the receiving carrier in terms of time and space from impregnating or providing impregnating means, respectively. Quasi dry winding or laying of the semi-finished fibrous products onto the receiving carrier may be carried out at a manufacturer of such semi-finished fibrous products, for example. These wound receiving carriers may then be shipped and stored in an arbitrary manner. A corporate entity which may optionally be different may then remove the receiving carriers having the semi-finished fibrous products, for example from its own warehouse, in a spatially and temporally completely independent manner, if necessary even at short notice, and provide said receiving carriers in a comparatively simple manner with the impregnating means just prior to processing. Complex resin baths or guides for the semi-finished fibrous products are no longer required then. Furthermore, significantly simpler and cleaner processing may be achieved. The machines for manufacturing components using the impregnated semi-finished fibrous products may also be configured in a significantly simpler and/or more effective manner.

In a further design embodiment of the invention it is possible for excess or unwanted impregnating means to be removed after the semi-finished fibrous products or the volume of semi-finished fibrous products on the receiving carrier, respectively, have been impregnated. It may be avoided in this way that this excess impregnating means drips or drops and causes issues or contamination, respectively. However, above all, in this manner the content of impregnating means on the semi-finished fibrous products may be adjusted, this being highly significant above all for the processing quality of the impregnated semi-finished fibrous products or their weight and strength properties, respectively. It has been established in the context of the invention that the amount of impregnating means on the semi-finished fibrous products may be very well adjusted in this way.

The excess impregnating means may be advantageously suctioned or removed by negative pressure, respectively. This is particularly advantageously performed from the outside or from the upper or uppermost layers of the semi-finished fibrous products, respectively. In this way, the impregnating means may be introduced quasi from the inside at positive pressure or relative positive pressure, respectively, into the amount of semi-finished fibrous products, pass through the volume of semi-finished fibrous products and then, after having passed through all semi-finished fibrous products, be suctioned at the receiving carrier, where said impregnating means is in excess. Since the impregnating means may also be readily collected during suctioning, it may optionally also be directly reused for impregnating a further receiving carrier.

In an advantageous design embodiment of the invention the semi-finished fibrous products are applied onto the receiving carrier in an encircling manner, that is to say substantially wound thereonto. The semi-finished fibrous products here at least regionally surround the receiving carrier in an encircling manner. The semi-finished fibrous products advantageously largely or completely surround the receiving carrier. This may be performed on a rotating receiving carrier, such that the latter may be configured as a type of roll or wound-package body having a specific diameter. A receiving carrier of this type may be configured in a similar manner to receiving carriers which are known per se for semi-finished fibrous products of this type or generally for long or endless fibers, threads, respectively, ropes, or similar. The receiving carrier in a winding region advantageously has a constant cross section, or is advantageously cylindrical, respectively. It is possible for the receiving carrier in the winding region to be configured so as to be round or almost round, such that a wound-package body results. Projecting delimitations, for example of the type of projecting disks or bars, may be provided at the ends of the wound-package body.

As an alternative to a cylindrical wound-package body, a cross section which is variable in its longitudinal profile may be provided, so as to produce variable amounts of semi-finished fibrous products or thicknesses, respectively. In this way, variable conditions for the impregnating means which penetrates from the inside to the outside may be established.

In the case of a receiving carrier of this type having a wound-package body, the semi-finished fibrous products can be wound very easily, rapidly and above all also at a defined pressure, such that the degree of tightness to which the semi-finished fibrous products lie on top of one another can be precisely set. This is significant in order to be able to introduce the impregnating means both readily and reproducibly on the basis of known parameters. The tension during winding of the semi-finished fibrous products for the upper layers may thus optionally become less in order to still allow good penetration of impregnating means.

As an alternative to the semi-finished fibrous products being wound onto the receiving carrier, they may also be applied, for example laid, onto a receiving carrier which is configured so as to be rather flat. The semi-finished fibrous products here may be laid, for example by way of a special cross-laying technique, in a helical or meandering or ready cut manner, for example as multi-axis cross-laid structures, in individual planar layers onto the substantially flat receiving carrier and then, in the manner of layers built upon one another, be laid up onto themselves and also in defined orientations. Cross-laying aids, such as upwardly protruding pins or similar, which predefine the shape or the cross-laid pattern, may be optionally provided here. It is also possible here for the impregnating means to be introduced through the receiving carrier into the laid up semi-finished fibrous products.

In one design embodiment of the invention the semi-finished fibrous products may be applied onto the receiving carrier in an encircling manner as a single fiber bundle, preferably as roving or as a fiber bundle, respectively, having at least 15 000 or 20 000 individual fibers. Application here is performed by way of the width of precisely one fiber bundle or one roving, respectively, preferably such that no two fiber bundles or rovings are applied onto the receiving carrier beside one another but only in layers on top of one another. Each layer is thus formed by precisely one roving. The semi-finished fibrous products are advantageously configured in a tape-like manner as a fiber bundle or roving, respectively, the width thereof being greater than the thickness thereof; in particular, they are as wide as the receiving carrier. The width is preferably greater than the thickness by a factor of 10 to 100, particularly preferably by a factor of 20 to 40. The thickness may be 0.1 mm to 0.5 mm, and the width may be 2 mm to 6 mm or up to 10 mm. The receiving carrier or a wound-package body, respectively, in this case is very narrow and in particular has this width of only one fiber bundle or roving, respectively. The width of the wound-package body may thus be preferably 2 mm to 15 mm.

Permeability of the receiving carrier for the impregnating means is advantageously planar, or provided for the major part of the receiving carrier, respectively, or of the previously mentioned wound-package body, respectively. All regions of the receiving carrier on which semi-finished fibrous products bear are particularly advantageously configured so as to be permeable, such that good and complete penetration of the semi-finished fibrous products by the impregnating means is possible. A number of holes, clearances, apertures, or similar may advantageously be provided for permeability. These are particularly advantageously regularly arranged or uniformly distributed, respectively, across the face of the receiving carrier, so as to provide uniform permeability per area. However, in specific regions, particularly toward the lateral delimitations, there may be fewer thereof or they may be smaller, that is to say have the effect of lower permeability per unit area.

Particularly advantageously, a receiving carrier may in this way have regions in the manner of a sieve or a perforation pattern, which are configured for winding or laying up the semi-finished fibrous products and support them in a corresponding manner, on the one hand, but are still permeable to the impregnating means, on the other hand. The size of the aforementioned holes, clearances, or apertures is advantageously minor, for example in the range of 0.1 mm×0.1 mm to 1 mm×1 mm or even 5 mm×5 mm. They may also be bars or webs which run substantially in the longitudinal direction of the receiving carrier and which are retained by transversely running ribs or supports.

It is possible for a type of planar flow aid or distribution aid to be provided in the path of the impregnating means, ahead of the semi-finished fibrous products, so as to improve distribution of the impregnating means into the semi-finished fibrous products. Said flow aid is advantageously configured as a type of wide-meshed warp-knitted fabric or woven fabric, having a mesh width in the size range of the aforementioned holes. On account thereof, the impregnating means may quasi be subject to good transverse distribution or planar distribution, respectively, before penetrating into the semi-finished fibrous products. This flow aid or distribution aid may either be firstly applied or wound onto a receiving carrier as described earlier, respectively, for example in 1 to 4 layers, and the semi-finished fibrous products directly thereonto thereafter, when the impregnating means is introduced through the receiving carrier into the semi-finished fibrous products. Or the semi-finished fibrous products are initially applied onto the receiving carrier, and the distribution aid thereafter thereonto, or both are simultaneously applied. That is to say that it may also be expedient for the distribution aid to be initially applied onto the receiving carrier, the semi-finished fibrous product pack to be placed thereonto, and finally again a distribution aid to be used.

The receiving carrier is advantageously substantially hollow inside and has an interior space there; in particular, said receiving carrier is an aforementioned wound-package body for winding up the semi-finished fibrous products. This interior space is thus surrounded by permeable walls of the receiving carrier or of the wound-package body, respectively, and is formed thereby. The interior space here may be configured so as to be duct-like and have a diameter of a few millimeters up to a few centimeters. It is important for the cross section to be sufficiently large in order for a sufficient amount of impregnating means to be conveyed therethrough in the desired time. Furthermore, on account thereof, the initial winding radius for the semi-finished fibrous products is co-defined, of course.

In yet another design embodiment of the invention it may be provided that the receiving carrier or a wound-package body, respectively, across the surface or wall, respectively, thereof which is permeable to the impregnating means has permeability to the impregnating means which is regionally variable. In this way, the impregnating means may be brought into the receiving carrier or thereto having a pressure which is identical everywhere, but then flows through the receiving carrier in variable amounts. This may optionally be useful for a finally desired distribution of the impregnation of the semi-finished fibrous products. Alternatively, permeability may also be identical throughout, simplifying the manufacture of the receiving carrier.

In one advantageous design embodiment of the invention, penetration of the semi-finished fibrous products which have been applied onto the receiving carrier is carried out with and supported by impregnating means, there being a plurality of possibilities to this end. On account of the typically given viscosity of the impregnating means used, in particular of resins, and of a practically useful winding density of the semi-finished fibrous products on the receiving carrier, self-acting penetration such as achieved in dipping, that is to say achieved substantially also by way of capillary effects, is not sufficient. Impingement by way of a force or centrifugal force, respectively, which is caused by rotation or rapid movement of the receiving carrier, is possible. A further possibility lies in impinging the impregnating means with positive pressure, or high pressure, respectively, preferably at 1.2 bar to 5 bar or even 20 bar, supplied to or into the receiving carrier, so as to impregnate the semi-finished fibrous products. An even further possibility lies in applying negative pressure from the outside, that is to say from that side onto the layers of the semi-finished fibrous products, from which the impregnating means may also be removed again. Such negative pressure may be 0.9 bar to 0.1 bar, optionally even up to 0.01 bar. It is advantageously possible for a plurality of these possibilities to be combined, in particular the combination of positive pressure and negative pressure.

In order to trap impregnating means which exits from the layers of semi-finished fibrous products so as to avoid contamination, it may be advantageous for a tubular or bag-like or housing-like sheathing, respectively, or a corresponding container to be provided, in which the receiving carrier is located with the semi-finished fibrous products during impregnation. A supply line for the impregnating means is routed thereinto, and a discharge line is routed out therefrom. The aforementioned negative pressure may either be directly applied to the discharge line, or else a discharge line for negative pressure may be provided and another discharge line for excess impregnating means which has been removed therethrough from the semi-finished fibrous products. Advantageously, the sheathing is flexible or plastically deformable, respectively, and impermeable to air, preferably somewhat tubular, such that said sheathing supports the application of negative pressure, on the one hand, and on account thereof adheres very well to the outer sides of the layers of semi-finished fibrous products, on the other hand. On account thereof, a compression effect which facilitates the removal of impregnating means from the completely soaked semi-finished fibrous products can be achieved. The sheathing may be configured as a cost-effective thin pipe or tube, for example, for single use, such that said sheathing also does not have to be cleaned.

Suctioning of excess or superfluous impregnating means, respectively, may be performed in the same way as introducing the latter, thus for example from the inside in the case of a cylindrical hollow receiving carrier. Said suctioning may advantageously be performed on the outer side, such that impregnating and suctioning may be carried out more rapidly or in one operation, respectively.

For the operation, the receiving carrier together with semi-finished fibrous products and an aforementioned sheathing may be additionally introduced into a container. In this way, process control and operational cleanliness may be improved.

In the case of encircling application of the semi-finished fibrous products onto the receiving carrier, in one design embodiment of the invention a separating agent may be applied onto a lateral face of the fiber bundle or of the roving, respectively, in particular onto a lower side of the fiber bundle or roving, respectively, which faces toward the receiving carrier. In this way, the separating agent is always located between two layers of the fiber bundle or roving, respectively. The separating agent may be selected from the group of fabric-like, granular, or pulverulent, wherein the separating agent is advantageously permeable to the resin or the impregnating means. During subsequent unwinding of the impregnated fiber bundles or rovings, respectively, a fabric-like separating agent in the form of a separating fabric is simultaneously peeled therefrom and collected or wound up, respectively, on a separate receptacle. A granular or pulverulent separating agent may either drop down or remain in the fiber-composite part.

Except from the claims, these and further features are also derived from the description and the drawings, wherein the individual features may in each case be implemented individually or collectively in the form of subsidiary combinations in an embodiment of the invention and in other fields and may represent advantageous implementations which are registerable per se for which protection is herewith claimed. The subdivision of the application by way of intermediate titles and individual paragraphs does not limit the statements made therein in terms of their general validity.

BRIEF DESCRIPTION OF THE DRAWINGS

Exemplary embodiments of the invention are schematically illustrated in the drawings and will be discussed in more detail in the following. In the drawings:

FIG. 3B shows winding of an endless semi-finished fibrous product onto an alternative and very flat receiving carrier;

DETAILED DESCRIPTION OF THE EXEMPLARY EMBODIMENTS

Figures 1, 2:
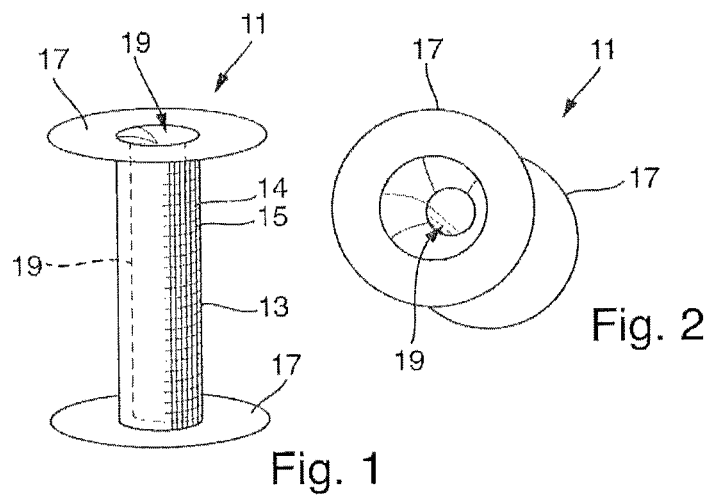
FIG. 1 shows a wound-package type receiving carrier from the side, having a perforated wound-package body.
FIG. 2 shows an oblique view of the receiving carrier of FIG. 1, looking into an interior duct of the receiving carrier.

A receiving carrier 11 according to the apparatus according to the invention, which is configured in part in a known manner, is illustrated in FIG. 1. The receiving carrier 11 has a wound-package body 13 which here is configured so as to be elongate and cylindrically round. Delimitation disks 17 which avoid lateral slippage of the applied semi-finished fibrous products and cause improved manageability of the receiving carrier 11 are provided at the ends of the wound-package body 13. An interior duct 19, which is open at least from one side and the opening of which is visible in the upper delimitation disk 17 is provided in the receiving carrier 11 or above all in the wound-package body 13. The profile of said interior duct 19 within the wound-package body 13 is illustrated in a dashed manner. The interior duct 19 may also be open at the other side or the other delimitation disk 17, respectively, or alternatively be closed. The receiving carrier 11 is about 20 cm to 25 cm in length; its diameter may be 3 mm to 2 cm. However, this is only an example; it could also be larger or significantly smaller. The oblique illustration of FIG. 2 shows the receiving carrier 11 of FIG. 1 in a more tilted position, and thus enables a look into the interior duct 19.

The wound-package body 13 per se is configured so as to be permeable or not closed, respectively, as has been discussed at the outset. It has a multiplicity of holes 14 having webs 15, and is thus configured so as to be mesh-like or sieve-like. A type of cross mesh is presently illustrated. However, further possibilities include a plurality of holes or bores in a wound-package body which is closed per se, longitudinal or radial slots, or else just a few holes, wherein a comparatively large number of holes which are distributed across the face of the wound-package body offer themselves for uniform introduction of impregnating means.

Figure 3A:
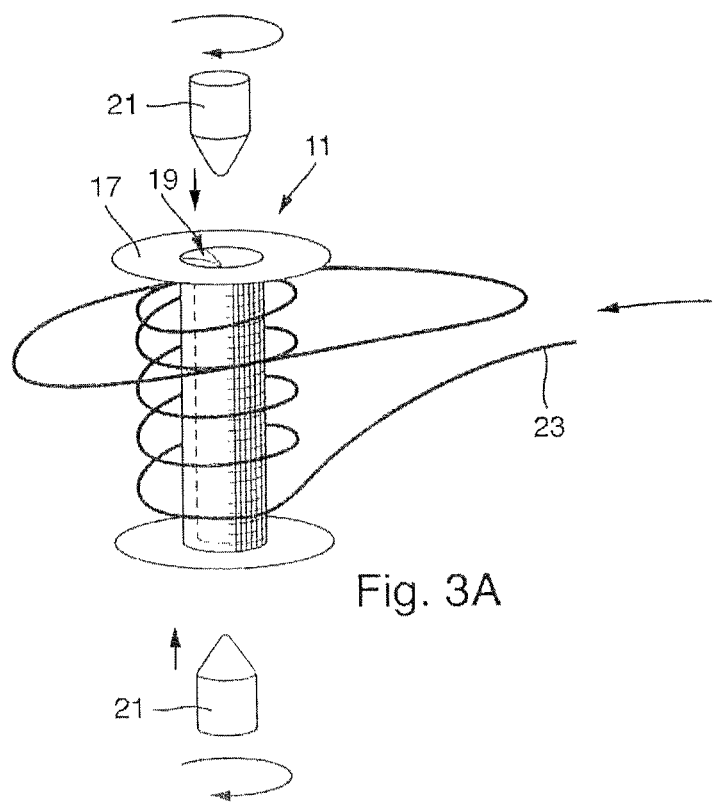
FIG. 3A shows winding of an endless semi-finished fibrous product onto the receiving carrier of FIG. 1.

It is illustrated in FIG. 3A how an endless semi-finished fibrous product 23 is wound by rotation in a known manner onto the receiving carrier 11, into the ends of which or onto the delimitation disks 17, respectively, and part-way into the interior ducts 19, mounts 21 are driven. This may be performed above all as is known in the prior art.

It is illustrated in FIG. 3B how an alternative receiving carrier 11' could be configured, and how a semi-finished fibrous product 23' is wound thereonto. The very flat or very narrow receiving carrier 11', respectively, is composed of two delimitation disks 17' and a wound-package body 13' having an interior duct 19' therein. The wound-package body is very short or very narrow, respectively, for example 2 mm to 10 mm wide. This results in a corresponding space between the delimitation disks 17', which is very tight or very narrow, respectively. It is illustrated in the center and below how a single fiber bundle 23', preferably here as so-called roving, is applied in an encircling manner onto the receiving carrier 11' as a semi-finished fibrous product. This fiber bundle 23' or roving, respectively, is significantly wider than thick, for example 0.2 mm thick and 6 mm wide. It may be composed of more than 15 000 individual fibers, as a so-called 24 k-roving of 24 000, for example. The fiber bundle is precisely as wide as the space between the delimitation disks 17' or their spacing, respectively. Thus, no semi-finished fibrous products or coilings or wrappings, respectively, are laid side-by-side during winding, but only on top of one another in layers. This is clearly identifiable below in FIG. 3B. Impregnating by way of impregnating means may then be performed as described also elsewhere, advantageously from the inside. The minor width here makes no difference and has no disadvantage.

Receiving carriers 11' of this type, having impregnated rovings thereon in comparatively large numbers, for example more than ten or twenty, may then be disposed beside one another at a laying head. The respective roving is unwound here from all said receiving carriers 11' in parallel, in order for a fiber-composite part to be manufactured. The rovings which have been unwound directly beside one another then collectively form a wide area or a very wide tape which is largely or completely closed. To this end, they may optionally be brought together in an even tighter lateral spacing by deflection means. Alternatively, the rovings in the unwound state may have a width which is beyond that of the space on the receiving carrier 11', such that they spread out somewhat after unwinding and automatically close ranks.

It is also illustrated how a separating agent in the form of a separating fabric 24' is applied as a long and narrow tape, about as wide as the spacing between the delimitation disks 17', onto the receiving carrier 11' at the same time as the fiber bundle 23'. This is performed by a deflection roller at or on the rear side of the fiber bundle 23', and the separating agent is thus always present between two layers of the fiber bundle 23'. Apart from being fabric-like, the separating agent could also be configured so as to be pulverulent or liquid. It may also be a resin granulate or recycled resin, for example. Such a separating agent should of course be capable of ready penetration by the impregnating means or not compromise the impregnating operation, respectively. On account of inherent permeability of the separating agent, impregnating may even be improved. Additionally, the separating agent may be helpful in impregnating in the case of resins having comparatively high viscosity and improve fixing of the as yet non-impregnated fibers. During unwinding of the provings, a fabric-like or contiguous separating agent or separating fabric, respectively, may then be wound on a dedicated wound-package and removed, such that it does not disturb.

Figure 4:
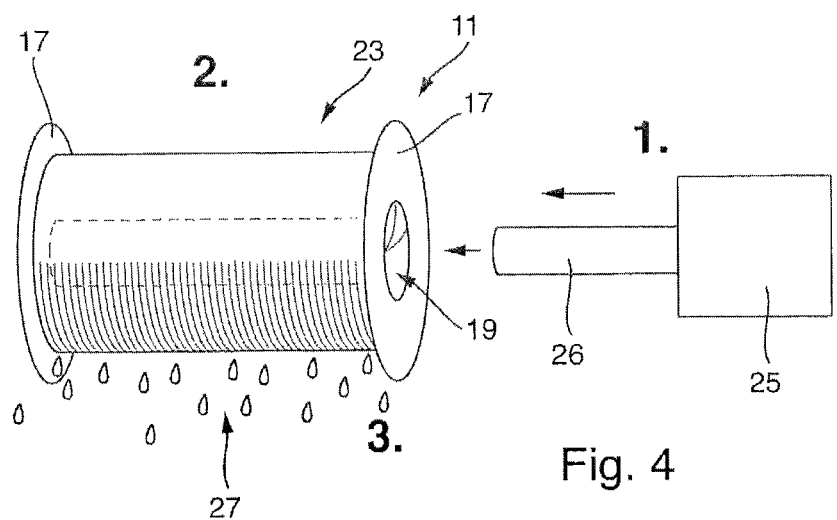
FIG. 4 shows in three steps impregnating of a receiving carrier which is wound with semi-finished fibrous product, by introducing impregnating means into the interior duct and subsequent removal of excess impregnating means.

It is illustrated in FIG. 4 how impregnation or infiltration, respectively, is performed in principle in a plurality of steps. An impregnation apparatus 25 having an elongate pipe 26 is introduced into the interior duct 19 of the receiving carrier 11 in a first step, or the receiving carrier 11 is pushed thereonto, respectively. The interior duct 19 here tightly seals on the outer side in relation to the impregnation apparatus 25 or to the pipe 26, respectively; said interior duct 19 is likewise closed on the left side or else provided with a further infeed for impregnating means. In a second step, impregnating means, for example a resin mentioned at the outset, is introduced at pressure into the interior duct 19 and is able to penetrate through the permeable wound-package body 13 and thus into the various layers of semi-finished fibrous product 23. The impregnating means here is advantageously impinged with pressure, for example a plurality of bar of positive pressure, as has been discussed at the outset. Negative pressure may be applied from the outside, as has likewise been discussed at the outset. The semi-finished fibrous product 23 is then slowly penetrated or impregnated, as it were, respectively, by the impregnating means from the inside to the outside. Whether said semi-finished fibrous product 23 is present in individual and easily differentiatable layers or not is not significant here. The viscosity of the impregnating means and the tension at which the semi-finished fibrous product has been wound onto the receiving carrier 11 have to be precisely coordinated in each individual case, such that complete penetration by the impregnating means is ensured. This tension may also be varied during winding according to FIG. 3, in particular may be increased or decreased, so as to enable as it were uniform penetration.

Once the receiving carrier 11 having the semi-finished fibrous product 23 or the semi-finished fibrous product pack which is formed by the wound semi-finished fibrous product has been completely penetrated or soaked and thus impregnated therewith, respectively, after the second step, according to a third step excess impregnating means, which is illustrated by the droplets 27, may be removed. Possibilities to this end have already been mentioned before and will be discussed in detail later.

As a result, a receiving carrier 11 having a semi-finished fibrous product pack or a wound up semi-finished fibrous product 23 which has been wound with comparatively minor complexity and has been impregnated to a specific degree in the desired manner with impregnating means is present. While the steps 1 to 3 of FIG. 4 of course are performed in sequence or within comparatively short time, respectively, any arbitrary time may lie between winding the semi-finished fibrous product 23 onto the receiving carrier 11 according to FIG. 3 and impregnating according to FIG. 4, as has been discussed at the outset.

By way of a modification of the invention, the afore-described sequence or direction, respectively, of the impregnating means during impregnation may also be reversed. The latter may thus be introduced from the inside to the outside by way of a pressure differential.

Figure 5:
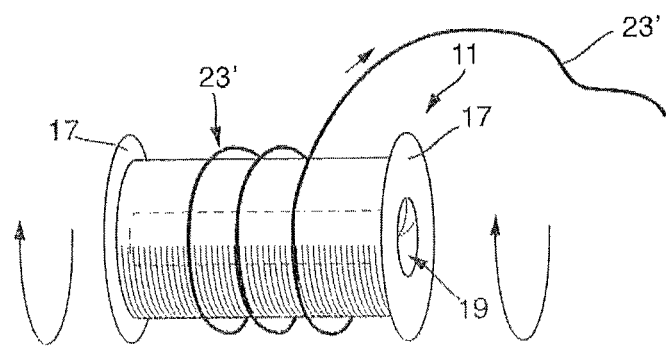
FIG. 5 shows unwinding of the impregnated semi-finished fibrous product from the receiving carrier as per FIG. 4, in a processing step of the impregnated semi-finished fibrous products.

The completely impregnated receiving carrier 11 having the impregnated semi-finished fibrous product 23' thereon may then be unwound or used, respectively, according to FIG. 5 in a processing step which is not illustrated in more detail. The unwound semi-finished fibrous product 23' then has a degree of impregnating means 27, or an amount thereof, respectively, thereon which is adapted to its use.

Figure 6:
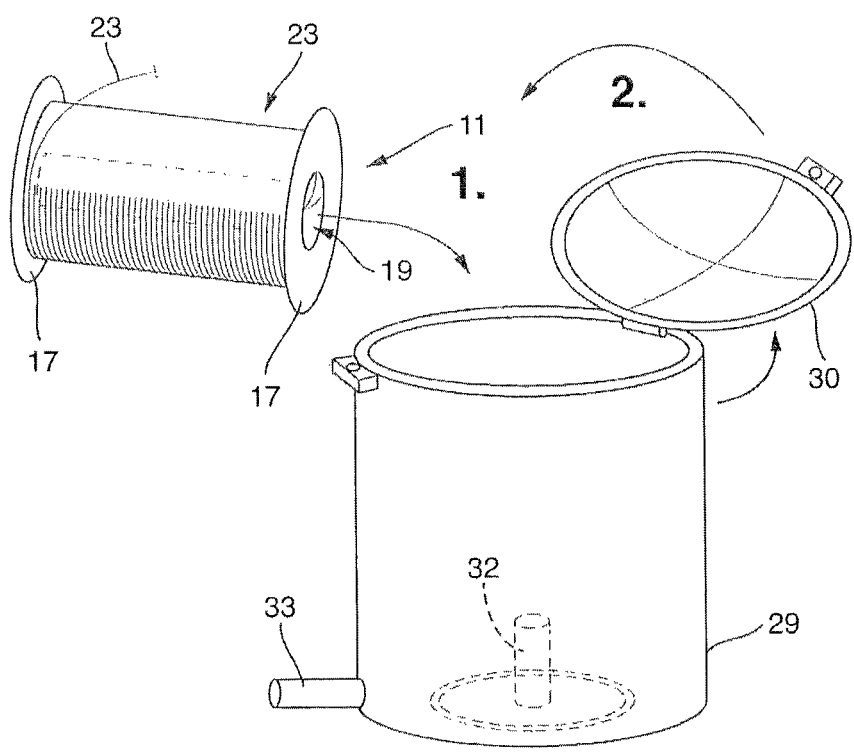
FIG. 6 shows a first specific design embodiment of a possibility for impregnating a receiving carrier wound with semi-finished fibrous product, by way of introduction into a closable container.
Figure 7:
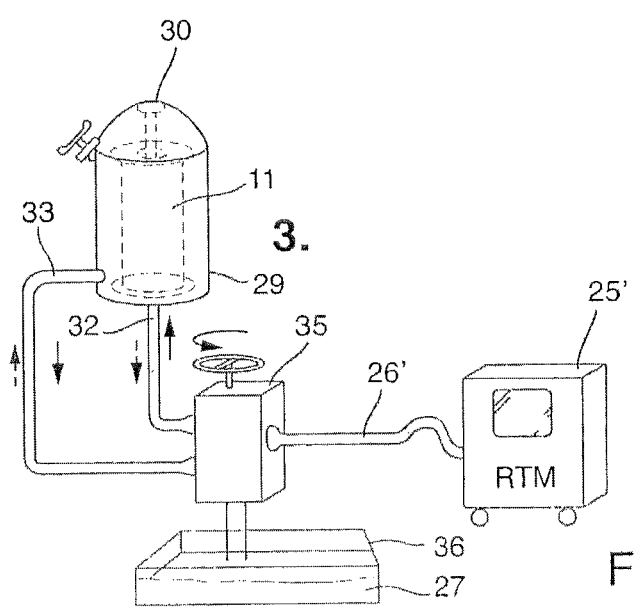
FIG. 7 shows impregnating by way of the closed container of FIG. 6, in a plant by way of supplying and discharging impregnating means.

A possibility for impregnating a wound receiving carrier 11 in a manner fit for practical use is specifically illustrated in FIGS. 6 and 7. Such a receiving carrier 11 having semi-finished fibrous product 23 thereon in a first step is introduced into a container 29 which is somewhat larger than the receiving carrier 11, for example 10% to 30% higher, and has a diameter which is larger by 20% to 100%. The container 29 is provided with a lockable cover 30 and an inlet 32 on the base, which also serves as a mounting, and a lateral outlet 33. The receiving carrier 11 by way of the wound-package body 13 or the interior duct 19 thereof, respectively, is placed onto the inlet 32. A connection between the lower delimitation disk 17 or the lower end of the interior duct 19, respectively, and the inlet 32 should be sealed. The interior duct 19 should also be sealed at the other end, or else the delimitation disk 17 should be implemented in a closed manner. Then the cover 30 is locked in the second step.

The third step is illustrated in FIG. 7, in which third step namely impregnating means is delivered to the inlet 32 at corresponding pressure from an impregnation apparatus 25' via a corresponding supply line 26' via a distributor 35, on the one hand. This impregnating means flows via the inlet 32 into the interior duct 19 and thereby penetrates the fiber pack on the receiving carrier 11, or the layers of the semi-finished fibrous products, respectively. Excess impregnating means or impregnating means which has exited the semi-finished fibrous products, respectively, exits laterally and may be removed at the outlet 33. This is advantageously performed by applying negative pressure, on account of which both the impregnating means which collects in the container 29 may be suctioned, and penetration of the semi-finished fibrous products by the impregnating means is supported. The outlet 33 in turn leads back to the distributor 35. The distributor 35 is also connected to a reservoir 36 for impregnating means 27, from which said distributor 35 both removes impregnating means for the inlet 32 and returns impregnating means from the outlet 33.

The reverse path of the impregnating means, in which the impregnating means is applied from the outside onto the semi-finished fibrous products, is illustrated by way of dashed directional arrows. On account of a corresponding pressure differential, said impregnating means then makes its way through the semi-finished fibrous products into the interior duct 19 of the receiving carrier 11, from where said impregnating means may be suctioned at the line 32.

The method may be controlled either purely in a temporal manner based on experience values, that is to say when desired and envisaged penetration of the semi-finished fibrous products with impregnating means is achieved after a specific time. Alternatively, measuring the amount of impregnating means in the receiving carrier 11 or in the semi-finished fibrous products 23 would be possible, for example by measuring weight or by differential amount measuring between the inlet 32 and the outlet 33.

During impregnation the receiving carrier 11 may be rotated within the container 29, optionally even very rapidly, such that the impregnating means is additionally supported in its penetration of the semi-finished fibrous products from the inside to the outside by the centrifugal force created thereby.

Figure 8:
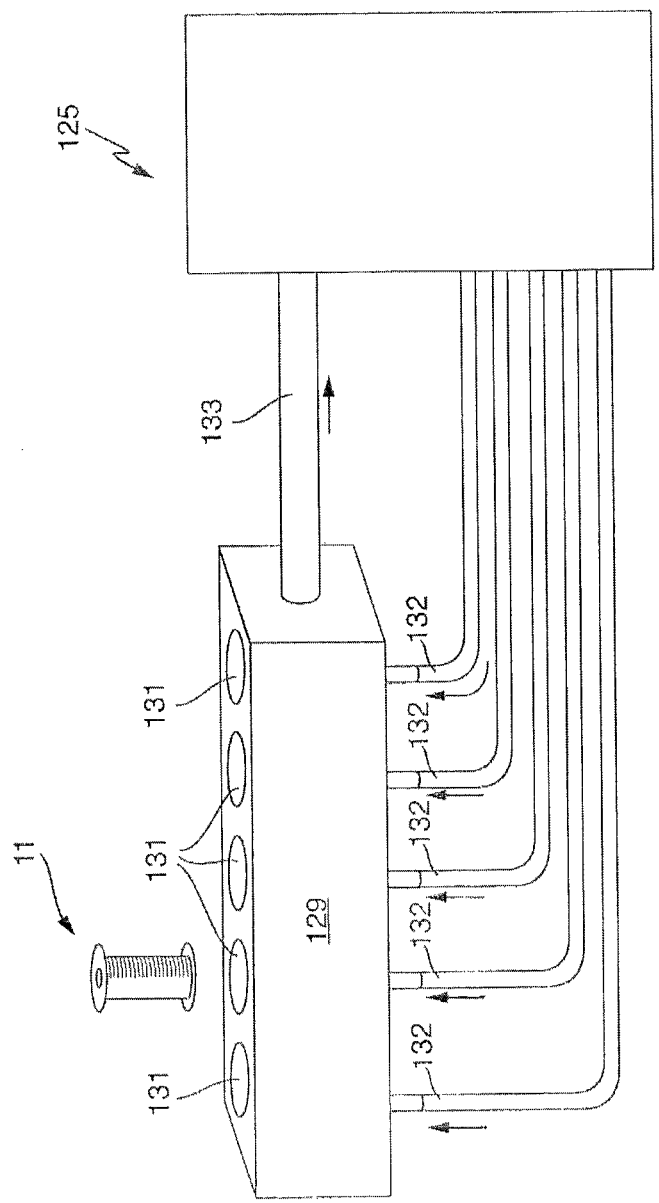
FIG. 8 shows a modified apparatus for impregnating a plurality of receiving carriers having semi-finished fibrous products, in a container.

A further variant of an impregnation apparatus 125 is illustrated in FIG. 8. A container 129 here has five receptacles 131 into which thus five receiving carriers 11 having semi-finished fibrous products thereon may be introduced. Five inlets 132 lead into the container 129, wherein only one single outlet 133 is provided. This numeric ratio may also be different, even optionally reversed. The individual receptacles 131 are substantially configured so as to correspond to the container 29 according to FIGS. 6 and 7, that is to say that another cover for tight locking is provided. In this way, a plurality of receiving carriers having semi-finished fibrous products thereon may be simultaneously impregnated. The right part of the impregnation apparatus 125 of FIG. 8 has the constructive units 25', 26', 35, and 36 of FIG. 7, and is very schematically illustrated here, in order to exemplify multiple simultaneous impregnating.

Figure 9:
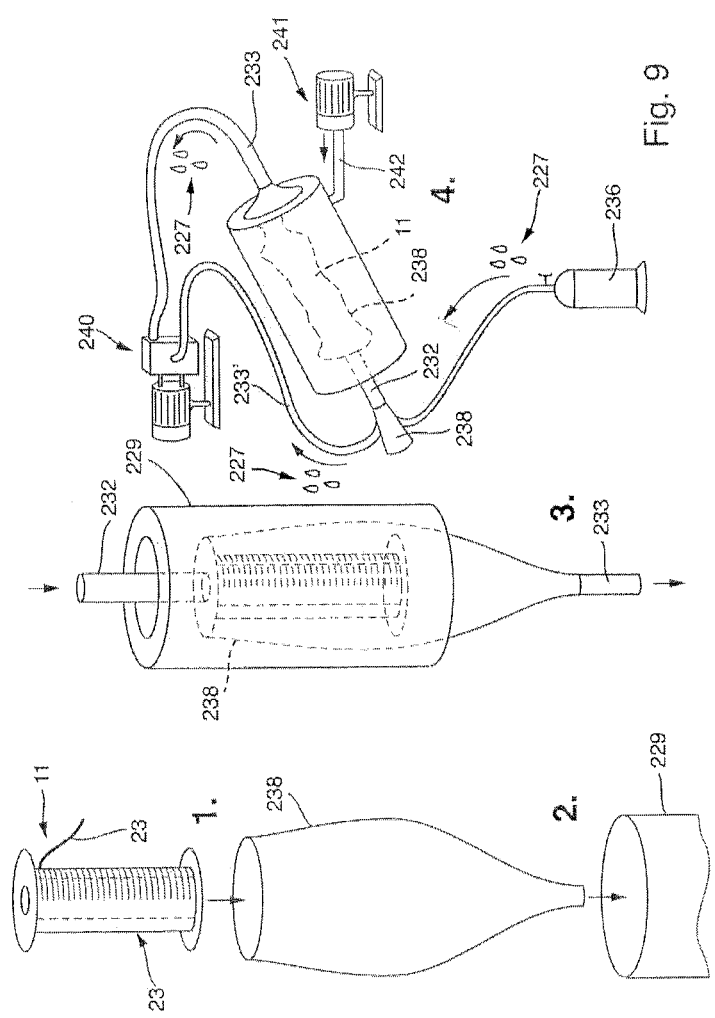
FIG. 9 shows in a plurality of steps impregnating a receiving carrier having semi-finished fibrous products thereon, in a flexible and tubular sheathing, by way of simultaneously introducing and suctioning impregnating means, including application of negative pressure on the sheathing.

An alternative method for impregnating a receiving carrier 11 having semi-finished fibrous product 23 thereon, in a plurality of steps, is illustrated in FIG. 9. The wound receiving carrier 11 in a first step here is introduced into a plastically deformable tube 238 which is open at both ends. The tube 238 in turn in a second step is introduced into a container 229 which is configured so as to be rigid and may also be locked in a tight manner. Said container 229 may be composed of rubber or natural rubber, optionally even of silicone, such that the former is also readily cleanable.

In a third step an inlet 232 is plugged or introduced into the container 229, the tube 238, and the receiving carrier 11 or into the interior duct 19 of the latter, respectively. Said inlet 232 is connected or terminated, respectively, in a sealing manner to the tube 238, at the upper end thereof, and advantageously also to the container 229, at the upper end thereof. An outlet 233 is plugged in from below, specifically only into the tube 238. The tube 238 here by way of its lower end protrudes from the container 229.

In the fourth step according to FIG. 9 impregnating means 227 is introduced via the inlet 232 from a reservoir 236, which itself is pressurized here, into the interior duct 19 of the receiving carrier 11 and penetrates the semi-finished fibrous product, which is wound on the latter, from the inside to the outside in a known manner. Negative pressure from a pump 240 is applied to the tube 238 via the outlet 233. On account of this negative pressure, penetration of the semi-finished fibrous products by the impregnating means 227 is facilitated. Furthermore, excess or exited impregnating means may be discharged at the outlet 233 and reused in a manner not illustrated for a further impregnating operation, for example.

Expanding the explanation of step four, it is further illustrated in FIG. 9 that a further outlet 233' is connected to that end of the tube 238 at which the inlet 232 also passes through. This part of the tube 238 may thus also protrude from the container 229. The negative pressure for suctioning excess impregnating means, which is applied by the pump 240, is likewise applied at the outlet 233'.

A further advantage of impinging the tube 238 with negative pressure by the pump 240 lies in that at the same time a certain force acts from the outside on the fiber pack or on the wound up semi-finished fibrous products, respectively, on account of which an excessive amount of impregnating means in the semi-finished fibrous product pack or of the semi-finished fibrous products, respectively, may be avoided. The content or amount of impregnating means, respectively, may thus also be adjusted in this manner. The semi-finished fibrous product impregnated with impregnating means may be quasi squeezed again to the desired degree.

This squeezing or compressing, respectively, may be supported by a further pump 241 which operates as a positive-pressure pump and is connected to the container 229 via a pressure line 242. Said pump 241 may impinge the container with positive pressure, for example a few bar, specifically either with air or a fluid. On account thereof, pressure for the removal of excess impregnating means which acts on the impregnated semi-finished fibrous products on the receiving carrier 11 may yet again be greatly increased.

Figure 10:
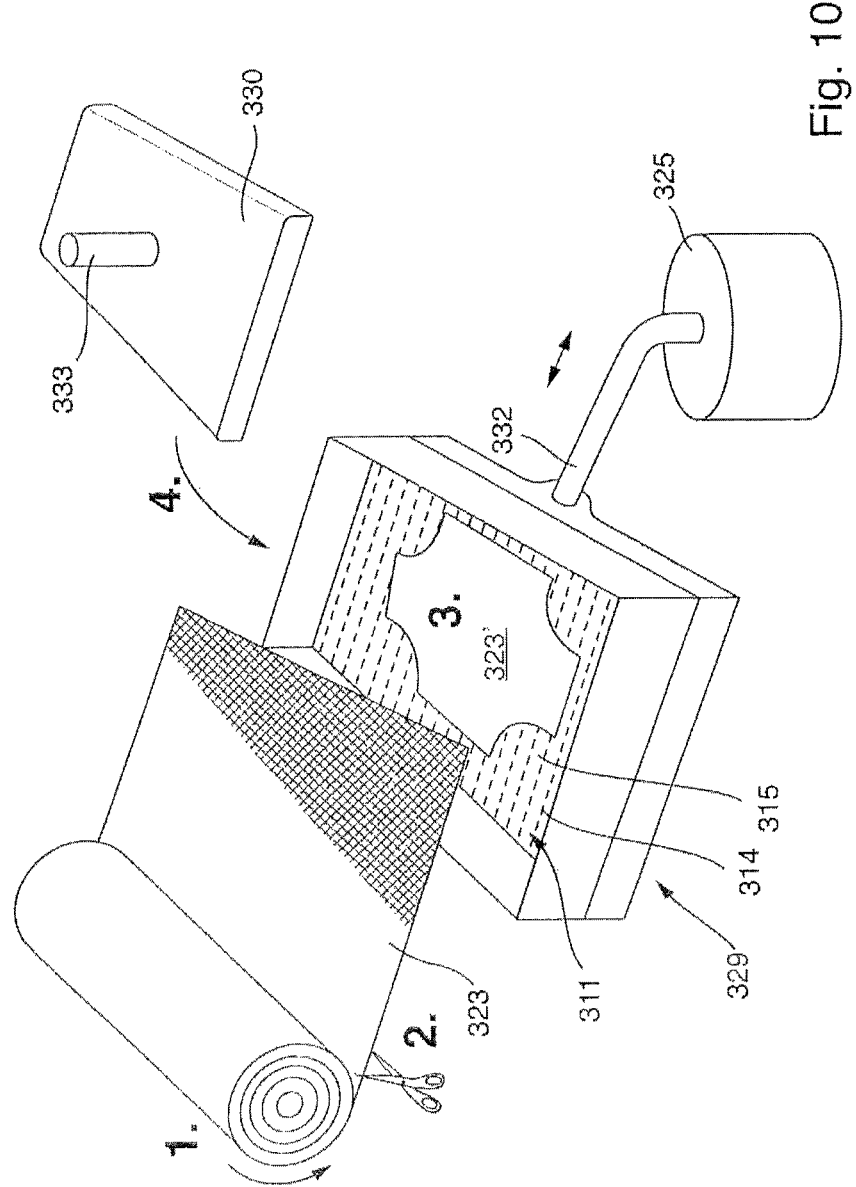
FIG. 10 shows in a plurality of steps impregnating a receiving carrier which is configured so as to be flat, having a layer of semi-finished fibrous product as an arbitrary blank thereon, in a pressure vessel with a container cover.

A yet further alternative method for impregnating or infiltrating, respectively, semi-finished fibrous product in the form of a cross-laid structure 323, which may also be a woven fabric, a braided fabric, an embroidered fabric, or a warp-knitted fabric, in a container 329 in a plurality of steps is illustrated in FIG. 10. A flat base, which here is configured so as to be planar and which, corresponding to the wound-package body 13 from FIG. 1, has a multiplicity of holes 314 having a multiplicity of interdisposed webs 315, is provided as a type of receiving carrier 311 at the bottom of the container 329. This quasi flat embodiment of the receiving carrier has been mentioned at the outset as an alternative to a wound-package type receiving carrier. The cross-laid structure 323', which in a first step has been unwound and in a second step may be cut to size in any arbitrary manner, but not necessarily so, in a third step is laid up on the receiving carrier 311 or the base of the container 329, respectively.

Subsequently, in a fourth step a cover 330 is placed onto the container 329 or into the container walls thereof, respectively, specifically in such a manner that the cover 330 by way of its not illustrated lower side bears on the introduced cross-laid structure 323'. This lower side of the cover 330 is configured in a similar manner to the receiving carrier 311, that is to say having openings and webs, in a manner so as to be permeable to an impregnating means, respectively.

An inlet 332 of an impregnation apparatus 325 is provided on the container 329, or below the base thereof which is provided with openings 314, respectively. In a similar manner, an outlet 333, including a suction or pressure pump which is not illustrated here, is provided at the top of the cover 330. The functions of the inlet 332 and outlet 333 may also be reversed, as is exemplified by the arrows. This is furthermore also readily comprehensible to a person skilled in the art by means of the description of FIG. 7.

By way of the arrangement which is illustrated in FIG. 10, a flat cross-laid structure 323' from semi-finished fibrous products, which is to remain flat throughout, may thus also be impregnated in a rapid and simple manner. To this end, the cross-laid structure 323', which is cut to size, is held between the receiving carrier 311 and the cover 330, or is compressed therebetween at a certain pressure, and an impregnating means is subsequently urged therethrough under pressure or is suctioned therethrough at negative pressure, as has been previously described and is illustrated as the fifth step in FIG. 11.

Figure 11:
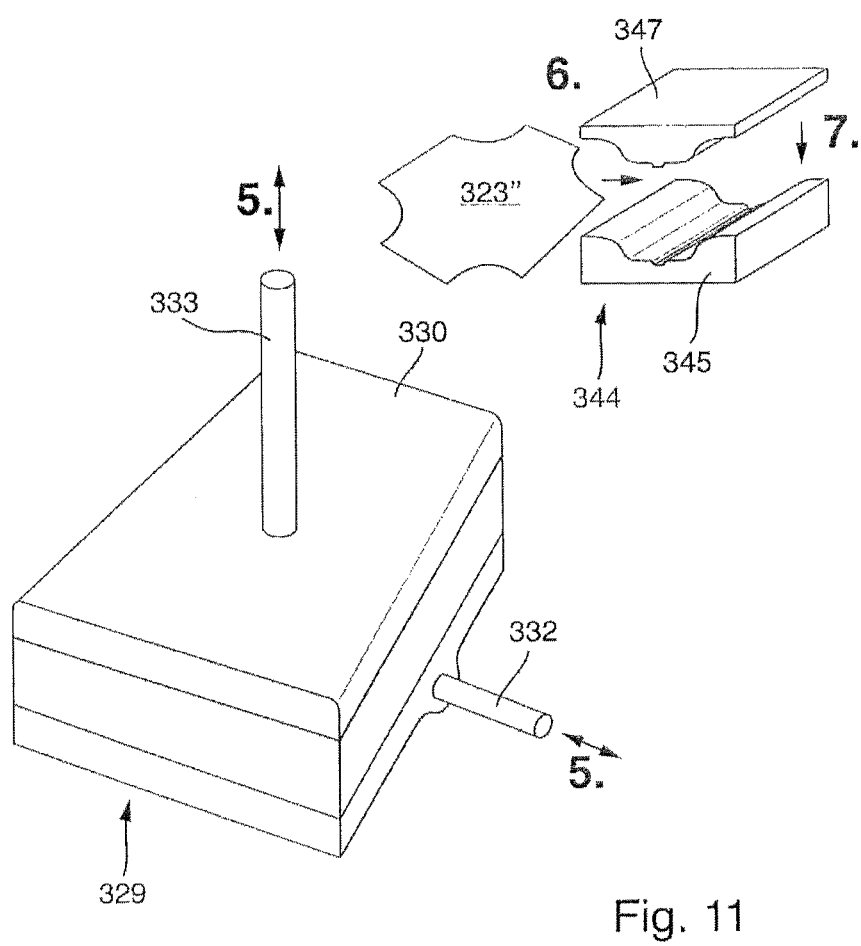
FIG. 11 shows the continuation of the method of FIG. 10; the blank being a substantially flat cross-laid structure, and subsequent delivery into a forming die.

Furthermore, a forming die 344, having a lower half 345 and an upper half 347, is illustrated at top right in FIG. 11. The lower half 345 and the upper half 347 are configured so as to be mutually congruent or fit into one another in a relatively precise manner, respectively. In a sixth step, the impregnated or infiltrated cross-laid structure 323", respectively, is laid up therein and then formed and cured in a seventh step.

The invention claimed is:

1. A method for impregnating semi-finished fibrous products in the form of long or endless fibers or fiber bundles using a liquid impregnating means, the method comprising the following steps:
    winding the semi-finished fibrous products onto a receiving carrier which is permeable to the impregnating means, wherein the semi-finished fibrous products are wound in an encircling manner on the receiving carrier in a plurality of layers on top of and across one another, wherein lower layers lie so as to be close to the receiving carrier and upper layers lie so as to be more remote from the receiving carrier,
    introducing the liquid impregnating means into the semi-finished fibrous products, wherein the liquid impregnating means initially passes through the receiving carrier at least once and then permeates the lower layers of the semi-finished fibrous products and then permeates the upper layers of the semi-finished fibrous products; and
    wherein penetration of the semi-finished fibrous products which are applied onto the receiving carrier by the liquid impregnating means is supported by
    exposing to external negative pressure,
    wherein for penetration of the liquid impregnating means, a tubular sheathing of a flexible material which is impermeable to air is placed over the receiving carrier and a supply line for the liquid impregnating means is routed into the sheathing into the interior of the receiving carrier, and
    wherein a discharge line routed to a negative-pressure installation or a negative-pressure pump, respectively, for suctioning excess impregnating means is routed out of the sheathing.

2. The method as claimed in claim 1, wherein excess or unwanted liquid impregnating means is removed after impregnation of the semi-finished fibrous products.

3. The method as claimed in claim 1, wherein the liquid impregnating means is introduced into the layers of the semi-finished fibrous products so as to pass through the regions which are occupied by the semi-finished fibrous products, from the inside to the outside, or first into the inside lower layers and then into the outside upper layers, respectively.

4. The method as claimed in claim 1, wherein the semi-finished fibrous products are applied onto the receiving carrier in an encircling manner as a single fiber bundle or roving, wherein no two fiber bundles or rovings are applied onto the receiving carrier beside one another but only on top of one another.

5. The method as claimed in claim 4, wherein the semi-finished fibrous products are configured as a fiber bundle or roving, respectively, the width thereof being greater than the thickness thereof.

6. The method as claimed in claim 1, wherein the receiving carrier is configured so as to be permeable to the liquid impregnating means, and has a multiplicity of holes, clearances, or apertures, or similar.

7. The method as claimed in claim 1, wherein said method is carried out by introducing the impregnating means from the inside by way of positive pressure and/or by suctioning the impregnating means from the external face of the semi-finished fibrous products by means of negative pressure.

8. The method as claimed in claim 5, wherein the width of the semi-finished fibrous products is greater than the thickness thereof by a factor of 10 to 100.

9. A method for impregnating semi-finished fibrous products in the form of long or endless fibers or fiber bundles using a liquid impregnating means, the method comprising the following steps:
    winding the semi-finished fibrous products onto a receiving carrier which is permeable to the impregnating means, wherein the semi-finished fibrous products are wound in an encircling manner on the receiving carrier in a plurality of layers on top of and across one another, wherein lower layers lie so as to be close to the receiving carrier and upper layers lie so as to be more remote from the receiving carrier,
    introducing the liquid impregnating means into the semi-finished fibrous products, wherein the liquid impregnating means initially passes through the receiving carrier at least once and then permeates the lower layers of the semi-finished fibrous products and then permeates the upper layers of the semi-finished fibrous products; and
    wherein penetration of the semi-finished fibrous products which are applied onto the receiving carrier by the liquid impregnating means is supported by exposing to external negative pressure,
    wherein during an encircling winding of the semi-finished fibrous products onto the receiving carrier, a separating agent is applied onto a lateral face of the fiber bundle or of the roving, respectively; and
    wherein the separating agent is selected from the group of fabric, granular, or pulverulent, and wherein the separating agent is permeable to resin.

10. The method as claimed in claim 9, wherein during subsequent unwinding of the impregnated fiber bundles or rovings, respectively, the fabric separating agent is simultaneously peeled therefrom and collected in a separate receptacle.

11. The method as claimed in claim 9, wherein the separating agent is applied onto a lower side of the fiber bundle or roving which faces toward the receiving carrier.

* * * * *